April 22, 1930.                G. JACOBS                1,755,181
                               CONDENSER
                        Filed Aug. 24, 1923      2 Sheets-Sheet 1

INVENTOR.
George Jacobs
BY Edward N. Pagelsen
ATTORNEY.

April 22, 1930.  G. JACOBS  1,755,181
CONDENSER
Filed Aug. 24, 1923  2 Sheets-Sheet 2

INVENTOR.
George Jacobs
BY Edward N. Pagelsen
ATTORNEY.

Patented Apr. 22, 1930

1,755,181

UNITED STATES PATENT OFFICE

GEORGE JACOBS, OF DETROIT, MICHIGAN

CONDENSER

Application filed August 24, 1923. Serial No. 659,171.

This invention relates to that type of condensers in which a group of segmental and preferably substantially semi-circular metal plates is rotatable relative to another group of similar plates, and its object is to produce a condenser which will have constant capacity under all circumstances, which will have minimum resistance in the leads and plates, minimum resistance between the plates, and which will have minimum absorption in the dielectric.

As has been stated by the United States Bureau of Standards, an ideal condenser is independent of changes in temperature, atmospheric pressure or other external conditions, as well as independent of the voltage, frequency, length of charge and discharge, and all other modifications of the circumstances under which it is measured. When used on an alternating-current circuit, the current flowing through such an ideal condenser should be ninety degrees ahead of the simple harmonic electromotive force impressed upon the condenser, and therefore the energy loss would be zero.

My invention consists in a series of parallel heavy segmental and substantially semicircular metal plates mounted in suitable insulating supports, alternating plates being movable relative to the others, the insulating supports having parallel sides and the edges of the peripheries of adjacent supports having sliding engagement.

It further consists in cutting away the faces of the plates so that the faces of adjacent plates will be separated by a thin film of air.

It also consists of the details of construction, illustrated in the accompanying drawings and particularly pointed out in the claims.

Figure 1:
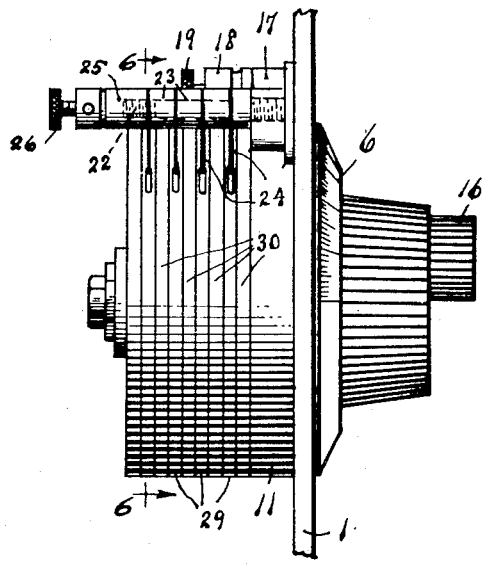
Figure 2:
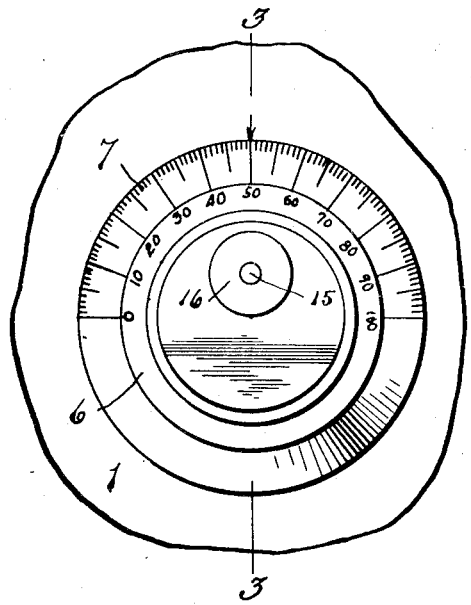
Figure 3:
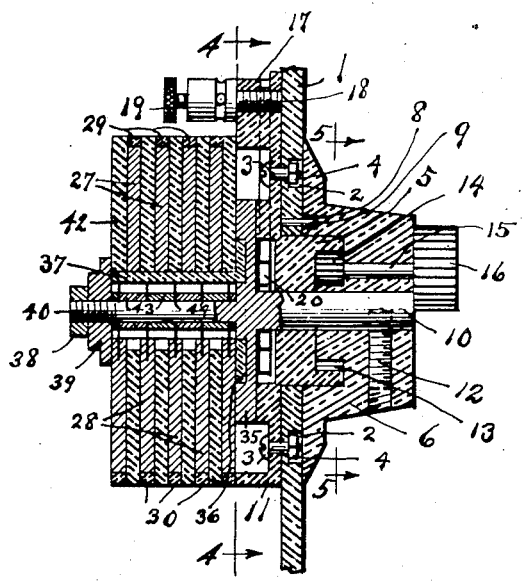
Figure 4:
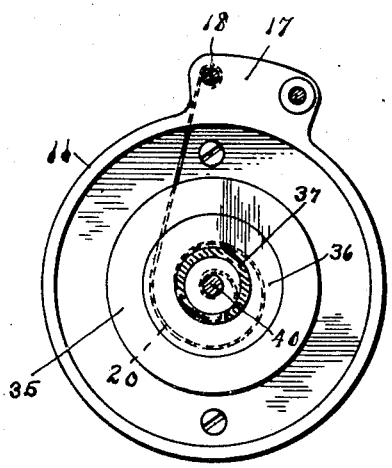
Figure 5:
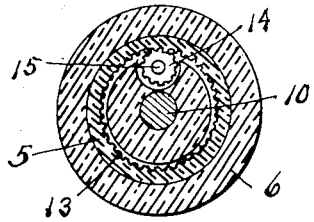
Figure 6:
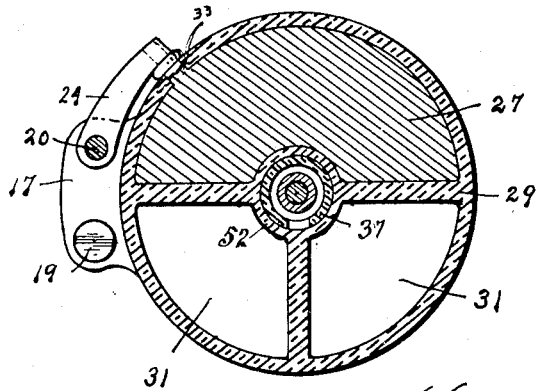
Figure 7:
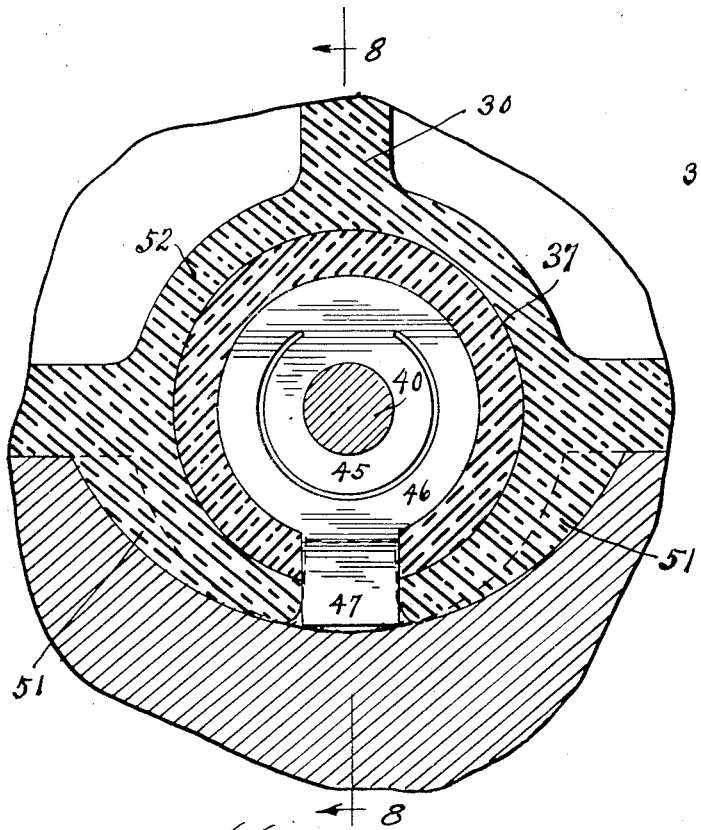
Figure 8:
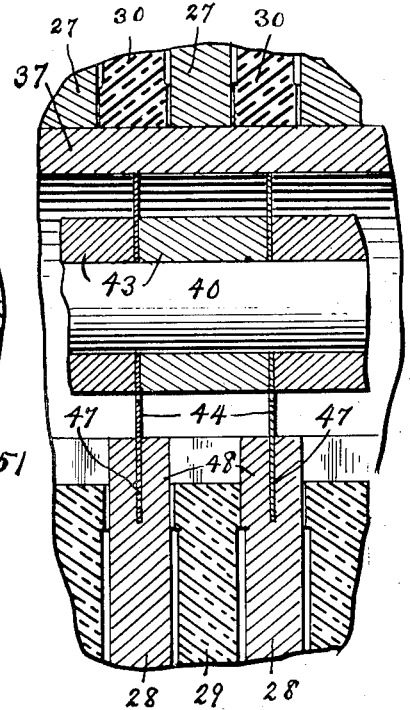

In the drawings, Fig. 1 is a side elevation and Fig. 2 is a front elevation of my novel condenser. Fig. 3 is a section on the line 3—3 of Fig. 2. Figs. 4 and 5 are sections on the lines 4—4 and 5—5 of Fig. 3 respectively. Fig. 6 is a section on the line 6—6 of Fig. 1. Fig. 7 is an elevation of the central portion of a supporting disk for the rotatable plates on a larger scale. Fig. 8 is a section on the line 8—8 of Fig. 7.

Similar reference characters refer to like parts throughout the several views.

A supporting plate 1 of any desired size may be formed with countersunk holes 2 to receive the bolts 3 and nuts 4 which secure the base 11 of this condenser in position. This base is preferably of a phenol condensation product or other good insulating material and has a hub 5 extending through the plate 1 and on it is rotatable the dial 6 having graduations 7. I prefer to form a semi-circular groove 8 in the rear face of this dial to receive the pin 9 which projects from the plate 1 and limits the arc through which the dial can be turned. A shaft 10 is rotatably mounted in the hub 5 and a screw 12 may be used to secure the dial to the shaft. The hub 5 is preferably formed with a ring 13 of internal teeth to mesh with the pinion 14 on a small shaft 15, rotatably mounted in the dial. The knob 16 on the outer end of this shaft may be used to slowly turn the dial and the shaft 10.

The base 11 is formed with an ear 17 which supports two metal binding posts. The shorter post 18 screws into this ear and has the usual binding screw 19 to secure the circuit wire in position. Its inner end connects to a spiral conductor 20 which attaches to the shaft 10 at its inner end and permits free rotation thereof in either direction. The longer post 22 extends through a series of sleeves 23 and flexible terminals 24 which attach to alternate condenser plates as hereinafter described. A nut 25 on the outer end of this post secures the sleeves and connectors in position and receives the binding screw 26.

The condenser plates 27 and 28 are preferably of aluminum, quite thick and substantially semi-circular. They are mounted in circular or disk supporters 29 and 30, one of which is shown in elevation in Fig. 6. These disks are of insulating material formed with segmental holes 31 to make them lighter. Alternating plates 27 are formed with thin ears 33 projecting through the peripheral portions of the disks and engaging the terminals 24 by which they are prevented from turning and by which these alternate plates are connected electrically to the longer binding post.

These terminals are made thin so as to be flexible and so as to permit the plates 27 to move longitudinally of the shaft 10.

A disk 35 on the shaft 10 intermediate its ends is formed with a circular recess to receive the circular flange 36 on the inner end of a cylindrical sleeve 37 of insulating material. All the supporting disks are mounted on this sleeve and this sleeve is secured to the shaft to turn therewith by means of the jamb nuts 38 and 39 on the reduced portion 40 of this shaft. The length of this sleeve is such that the nuts press the outer disk 42 toward the plate 1 with sufficient force to hold the several disks in actual contact but still permit rotary movement and sliding contact between them.

On the portion 40 of the shaft are short spacing sleeves 43 and between them the terminals 44 shown on a larger scale in Fig. 7 and each consisting of two connected annular portions 45 and 46 and a tongue 47 projecting from the portion 46 opposite the connection. This structure permits the tongues 47 to move freely longitudinally of the shaft, and of the inner portions 45, a considerable distance, and these tongues on the inner terminals extend into and are secured in slots formed in the inwardly extending tongues 48 on alternate condenser plates 28. The sleeve 37 is formed with a longitudinal slot into which the tongues 48 on the plates 28 and the tongues 47 on the terminals 44 extend.

As shown in Fig. 8, the plates 27 and 28 are somewhat thinner, preferably about two one-thousandths of an inch, than the peripheries of the supporting disks so that there will be about this much space between plates. As these plates are preferably about three-thirty-seconds inch thick, they can be machined with great accuracy and the spacing between them may be made uniform to within less than one-tenth of the space.

The tongues 51 indicated in Fig. 7 are formed on what might be called the hubs 52 of the disks and extend into the grooves in the inner edges of the plates to prevent axial movement of the plates within the apertures in the disks.

This condenser then has its plates of regular geometric form; it is rigidly constructed; and is capable of having its dimensions accurately determined. The outer peripheries of the supporters of the plates are substantially guard rings and contact with each other in sliding engagement. The slight distance between the plates reduces the possible absorption of the dielectric and the small size of the terminals 24 and the small size and circular form of the terminals 44 renders them of small capacity. The standard of precision therefore of this condenser is high.

The outer disk 42 and its plate may be similar to the others in that both sides of the plate are exposed or the outer side of the plate may be coated in any desired manner. The length of the sleeves 43 is such that the nuts 38 and 39 and the plate 42 cause satisfactory electric contact between the shaft and the terminals 44.

The disks like the dial and supporting sleeve are preferably of one of the phenol condensation products and are placed in the molds wherein the plates are cast. The sides of the peripheries of these disks are continuous and as adjacent disks have sliding engagement along their peripheries, dust is excluded. This is very advantageous over condensers wherein plates which are entirely unprotected are employed. The control of the distance between adjacent plates is of the utmost importance and is provided for by the engagement of the peripheries of the disks in which the condenser plates are mounted. The laterally flexible terminals permit this accurate adjustment.

I claim:—

1. In a condenser, the combination of a base and a shaft rotatably carried thereby, a sleeve mounted on the shaft, a series of disks of insulating material mounted on the sleeve, means to cause alternate disks to rotate with the sleeve, means to cause alternate disks to remain stationary, plates of metal mounted in said disks and having parallel sides, and conductors connecting to the two groups of disks, part of said conductors comprising thin plates on said shaft and having tongues engaging alternate plates and the other conductors consisting of flexible strips connecting to fingers projecting through the peripheries of said disks, and a binding post to support said flexible strips.

2. In a condenser, the combination of a base adapted to be secured to a supporting plate and having a cylindrical hub provided with a ring of gear teeth, a dial mounted on said hub, a shaft rotatably mounted in said hub and having a pinion on its inner end meshing with said ring of gear teeth, a main shaft secured to said hub and extending through said base, binding posts carried by said base, a flexible connector between one of said binding posts and said main shaft, a sleeve of insulating material mounted on the main shaft, a series of disks of insulating material mounted on said sleeve, alternate disks being rotatable with the sleeve, segmental metal plates mounted in said plates, means connecting alternate plates electrically to the shaft, and means connecting the remainder of said plates to the second binding post.

3. A series of circular disks of phenol condensation product having sliding engagement at their outer edges, cast aluminum plates embedded therein, and a sleeve of insulating material on which the disks are mounted, alternate disks being rotatable on said sleeve.

4. A series of circular disks of phenol condensation product having sliding engagement at their outer edges, cast aluminum plates embedded therein, and a sleeve of insulating material on which the disks are mounted, alternate disks being rotatable on said sleeve, flexible terminals attaching to the exterior edges of the plates in the disks which are rotatable on the sleeve and other flexible terminals attaching to the inner edges of the other plates.

GEORGE JACOBS.